(12) United States Patent
Artal Lorente et al.

(10) Patent No.: US 9,175,667 B2
(45) Date of Patent: Nov. 3, 2015

(54) FASTENING SYSTEM FOR WIND TURBINES AND CORRESPONDING INSTALLATION METHODS

(71) Applicant: GAMESA INNOVATION & TECHNOLOGY, S.L., Sarriguren (Navarra) (ES)

(72) Inventors: Daniel Artal Lorente, Sarriguren (ES); Fernando De Las Cuevas Jimenez, Sarriguren (ES); Fermin Lazcoz Santesteban, Sarruguren (ES); Pedro Munarriz Andres, Sarriguren (ES)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 0 days.

(21) Appl. No.: 13/918,105

(22) Filed: Jun. 14, 2013

(65) Prior Publication Data

US 2013/0336716 A1    Dec. 19, 2013

(30) Foreign Application Priority Data

Jun. 15, 2012   (ES) .................................. 201200643

(51) Int. Cl.
 *F16D 1/06*   (2006.01)
 *F03D 1/06*   (2006.01)

(52) U.S. Cl.
 CPC ............ *F03D 1/0675* (2013.01); *F03D 1/0658* (2013.01); *F03D 1/0691* (2013.01); *F05B 2240/61* (2013.01); *F05B 2260/79* (2013.01); *Y02B 10/30* (2013.01); *Y02E 10/721* (2013.01); *Y10T 29/49332* (2015.01); *Y10T 403/64* (2015.01); *Y10T 403/645* (2015.01)

(58) Field of Classification Search
 USPC .......... 403/335–338, 367, 368, 373, 374.1, 1; 464/182
 See application file for complete search history.

(56) References Cited

U.S. PATENT DOCUMENTS 2,998,731 A * 9/1961 Renner ........................... 474/94
6,902,508 B2 * 6/2005 Stille et al. .................... 475/331

* cited by examiner

*Primary Examiner* — Daniel Wiley
(74) *Attorney, Agent, or Firm* — Ladas & Parry LLP

(57) ABSTRACT

A fastening system used for the joint between a rotary shaft and a wind turbines pitch system which includes a front flange and a rear flange, which are joined together and supported on the hollow rotary shaft, and which are coupled to the pitch system having the bearings for the shaft and the star-shaped part. A fastening method couples the rear flange to the hollow shaft with a tapered collar and also to the front flange through spacer bushings.

5 Claims, 5 Drawing Sheets

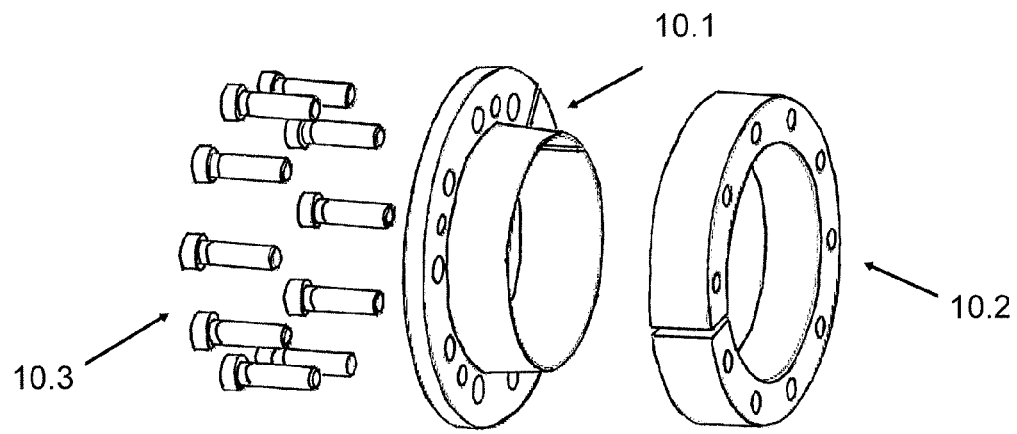
Fig. 4
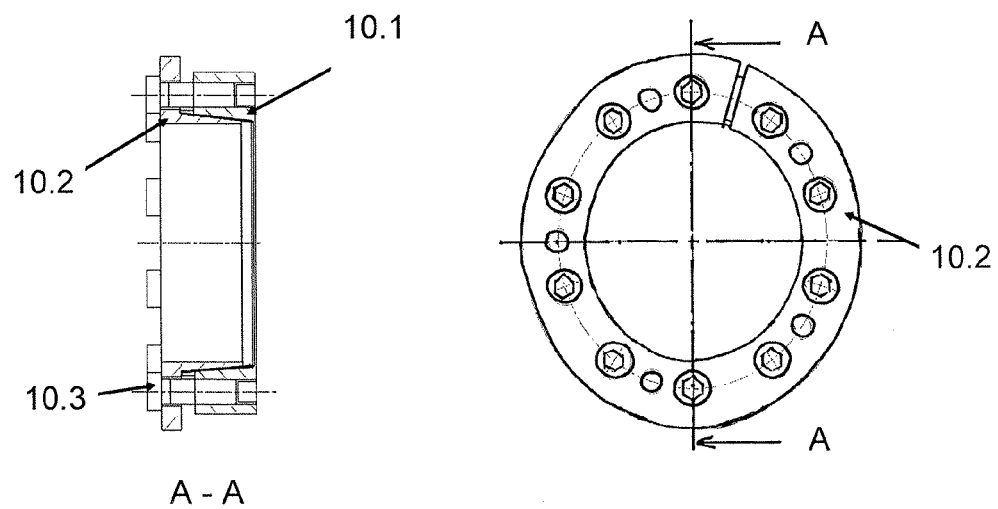
A - A
Fig. 5a
Fig. 5b

FASTENING SYSTEM FOR WIND TURBINES AND CORRESPONDING INSTALLATION METHODS

OBJECT OF THE INVENTION

The object of the invention is a fastening system that uses a flange to couple the hollow shaft to the pitch system. The method for installing this system in the hub is likewise described.

BACKGROUND OF THE INVENTION

Wind turbines are machines containing a large number of mechanical components of various sorts that undergo constant stress. These components require regular maintenance usually entailing visual or physical access. The purpose of predictive maintenance is to determine the parts undergoing the most stress so as to reinforce them with a view to precluding failure and subsequent replacement of the component following its failure. This is of particular importance if the failure of the component entails the use of costly cranes to undertake the aforementioned replacement tasks.

The wind turbine hub houses the pitch system, comprising a hydraulic drive unit that moves a pusher shaft inside the hollow shaft. The pusher shaft in turns moves the star-shaped part, which transfers movement to the three blades. The joint between this hollow shaft and the flange supporting the pitch system bearing box is an element that undergoes an enormous amount of stress. Moreover, its position is hardly accessible, which consequently encumbers regular inspection and maintenance tasks. With a view to precluding issues concerning this joint and as a part of predictive maintenance, a new flange-based fastening system is proposed.

This flange has the main characteristic of being doubled, resulting in the following advantages:

- The path of loads produced by the wind on the machine's pitch system is modified. This new reinforced flange renders better performance in terms of mechanical properties, as it is capable of transferring (through the reinforcement) greater moments and normal stresses by friction.
- It is an accessible solution and can thus be inspected visually for subsequent maintenance.
- It is easily mounted in the field with conventional tools (no need for hydraulic tools).
- It does not depend on the condition of the star or hollow shaft, nor any adjustment between these elements. Should the machinery undergo some sort of failure affecting the bolts in the joint between the hollow shaft and the hollow shaft flange, but continue running despite the broken bolts in this joint, the resulting wear would entail a significant loss of material in the hollow shaft that would damage the internal geometry of the hole in the star. This could cause a loss in the adjustment between both elements, consequently increasing the frequency and amount of incidents of this failure. When mounting the joint reinforcement using the double flange, the worn spots on these elements do not intervene, hence the success of the solution is independent of the condition of the star and hollow shaft.
- This solution is compatible with solutions that have been implemented previously in wind power farms comprising wind turbines, namely the reinforcement of the bolted joint by fitting shear pins between the hollow shaft and the star, the use of a key between the star and the hollow shaft, or the increase in the quality of the bolts constituting the joint itself.

DESCRIPTION OF THE INVENTION

An object of the invention is to reinforce the pitch system in wind turbines, particularly the bolted joint on the hollow shaft (corresponding to the hollow shaft flange) so as to increase its mechanical properties and thus prevent fatigue in this joint.

Another object of the invention is to develop a method for installing the double flange reinforcement mounted on the star element, whose movement moves the pitch of each blade. The method should follow certain steps for installation such as dismounting the pitch system in the hub and then mounting the reinforcement assembly.

These and further objects are achieved with a double flange comprising a front and rear flange, coupled to both ends of the star element by means of some bushings secured by nuts.

The rear flange is mounted on the hollow shaft and couples to the pitch system forming the star element. In other words, the rear flange is secured to the star indirectly by means of its union with the front flange. The front flange is secured to the star. This latter joint is made by a series of bolts on the outer part of the bearing box. It is not a direct joint between the rear flange and the star but an indirect joint.

The front flange has some radial orifices. The ones located on the outer part are used when securing the flange to the bearing box and the inner orifices are the initial joint between the flange and the hollow shaft.

The mentioned bushings are spacer bushings for coupling the rear flange to the star indirectly while separating the front flange from the rear flange sufficiently so that it does not interfere with the star.

To ensure that the tapered collar located on the inner part of the rear flange works properly, in addition to verifying proper surface cleanliness of the hollow shaft when mounting this collar, the star and rear flange must not come into direct contact. The tapered collar comprises two rings with an inclined plane on its contact surfaces so that when it acts on the bolts of the element approaching the rings, the inclined plane causes the outer collar to increase in diameter while the inner reduces it. The lack of material continuity in the rings is reflected by the groove created between both rings, which is necessary to enable this variation in diameter.

In the present fastening system, the spacer bushings must be coupled to flanges with an elevated tightening torque and, given the reduced dimensions of the area where the solution will be mounted, the desired tightening torque can solely be applied by a hydraulic tool. This would be rather costly from an economic standpoint, when considering the investment for the tool, and from a practical standpoint, as there will be difficulty working with it within the limited amount of available space. Such costs can be avoided by using Superbolt™ nuts. The nuts employed for the joint with the bushings enable torque values between their coupled elements that are significantly superior to the values that a worker could apply without using hydraulic tools.

BRIEF DESCRIPTION OF THE DRAWINGS

The following figures have been attached with a view to explaining the reinforcement used and its fastening method:

FIG. 4 is an explode perspective view of the tapered collar housed inside the circular hole of the rear flange.

FIG. 5a is a sectional view of FIG. 5b which shows the tapered collar.

DESCRIPTION OF THE PREFERENTIAL EMBODIMENT

Figure 1:
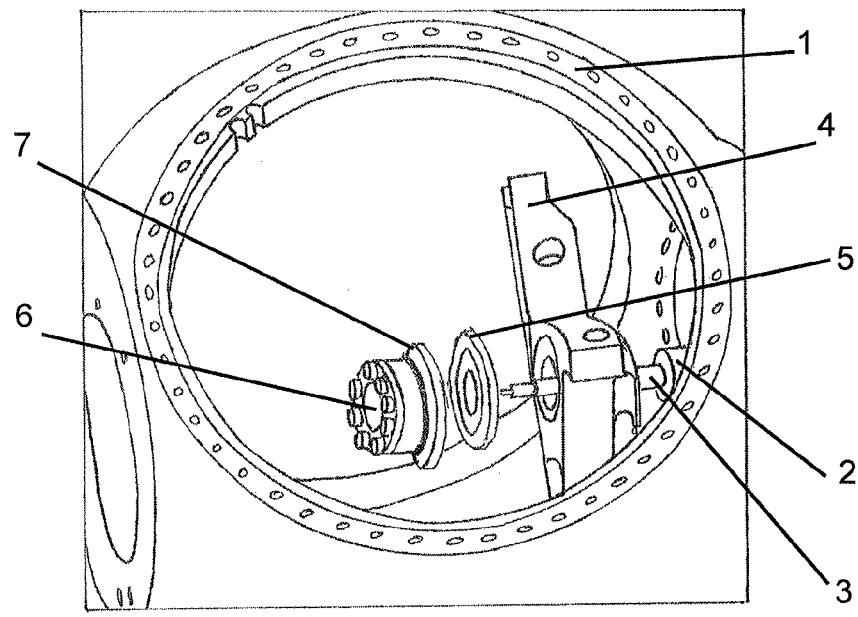
FIG. 1 is a perspective view of the configuration for the pitch system currently in use, which falls within current state of the art.

FIG. 1 reflects the current state of the art, in which the rotor includes two components, namely the hub (1) and the blades (not appearing in the figure). The wind turbine model of the invention is a three-blade variable pitch machine whose blades are coupled to the hub by bearings. Blades are moved by a hydraulic actuator which moves a pusher shaft (3) linearly. This pusher shaft (3) changes the pitch angle of the three blades simultaneously while moving a part known as the star (4), which unites the three blades, forwards and backwards. The hydraulic cylinder is located in the wind turbine nacelle and, therefore, does not rotate in synchronization with the rotor. A bearing (6) is placed between the pusher shaft (3) and the shaft (4) to keep the cylinder and the pusher shaft (3) from turning when the rotor rotates. The bearing is mounted inside a box coupled to the star (4) so that the outer ring (7) of the bearing (6) is joined to the box while the inner ring of the bearing is joined to the pusher shaft (3). A hollow shaft (2), which strengthens the pusher shaft in supporting the weight of the star and the bearing, is used.

The correct forward and backward guidance of the star (4) is assisted by using a bar secured to the hub along which a star arm slides. The hollow shaft (2) is installed to support the star. This shaft is coupled to the star (4) by a bolted joint with flange (5), reinforcement object.

Figure 2:
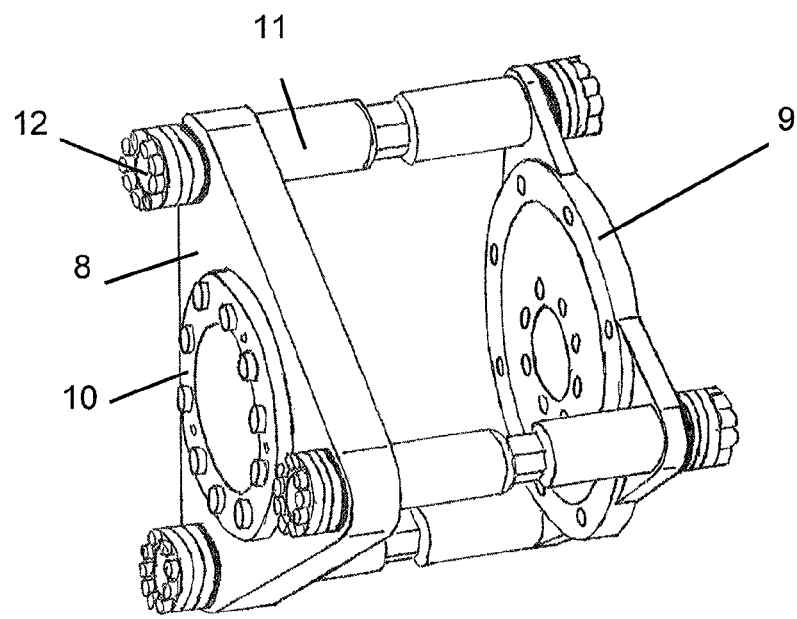
FIG. 2 illustrates the assembly of elements constituting the reinforcement following a perspective view.
Figure 3A:
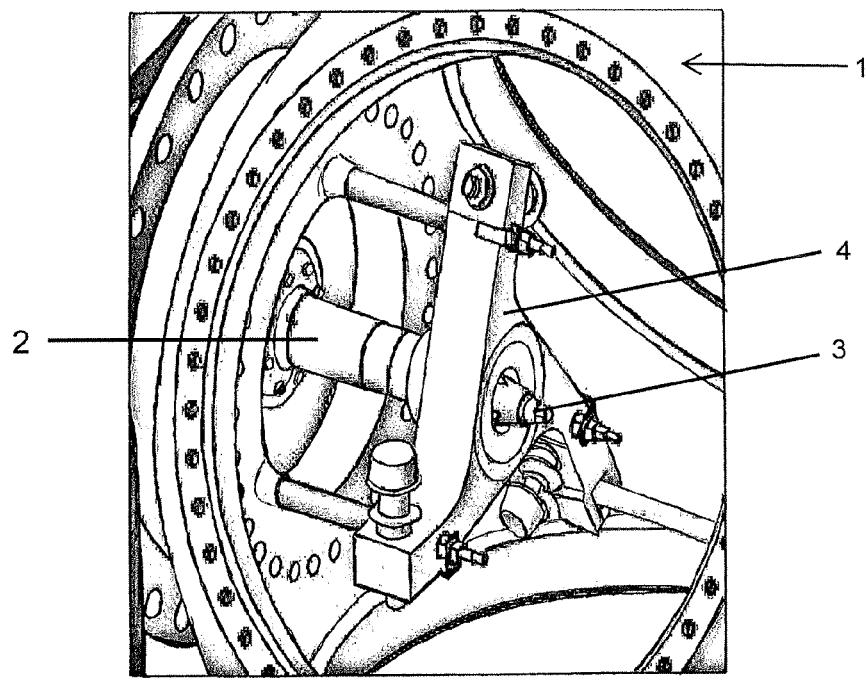
FIG. 3 entails various views (a, b, c, d, e) on the placement of the fastening system on the star element that executes the pitch movement.
Figure 3B:
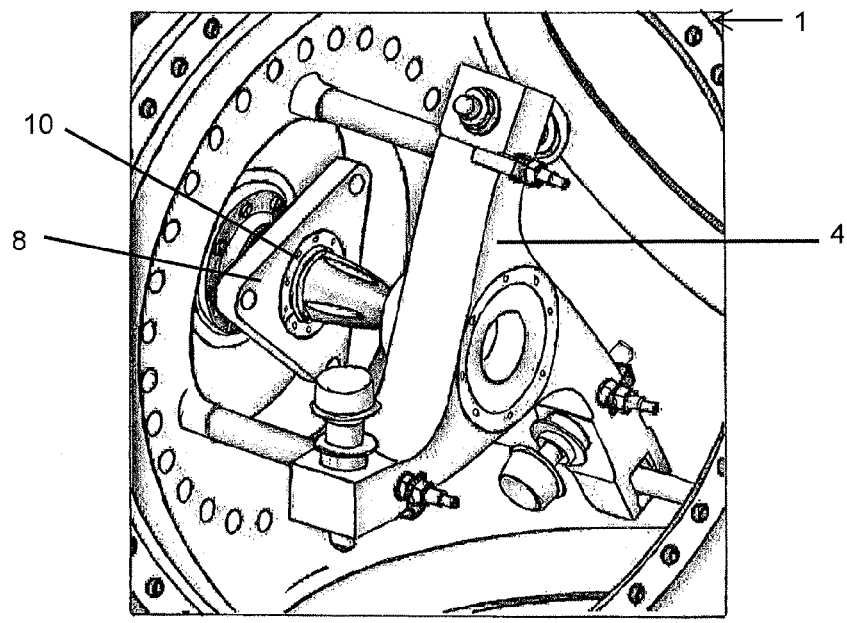
Figure 3C:
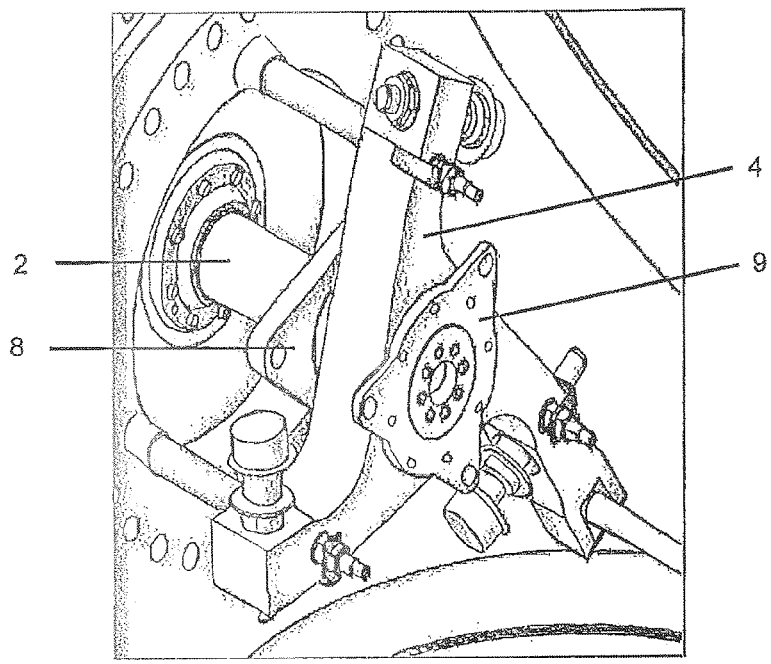
Figure 3D:
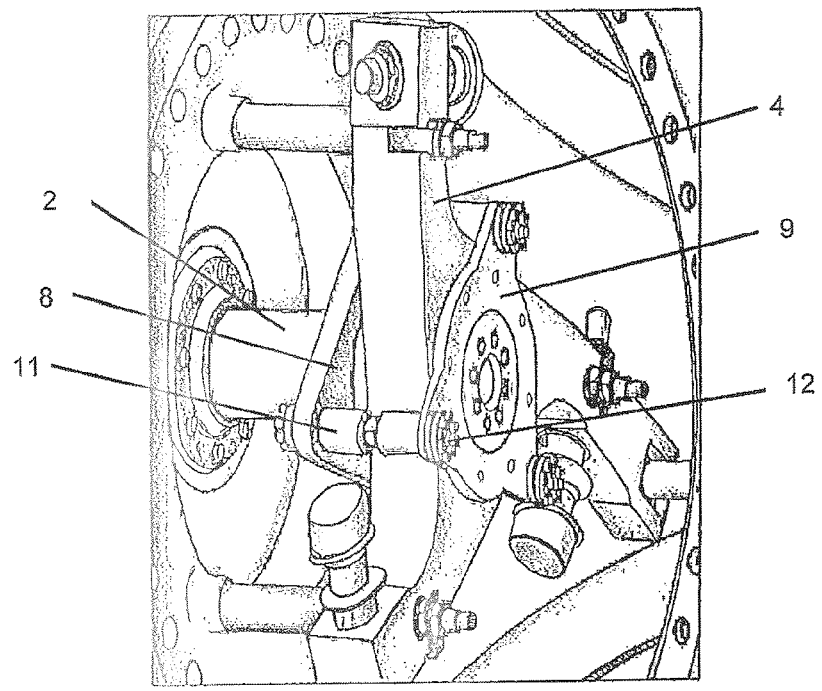
Figure 3E:
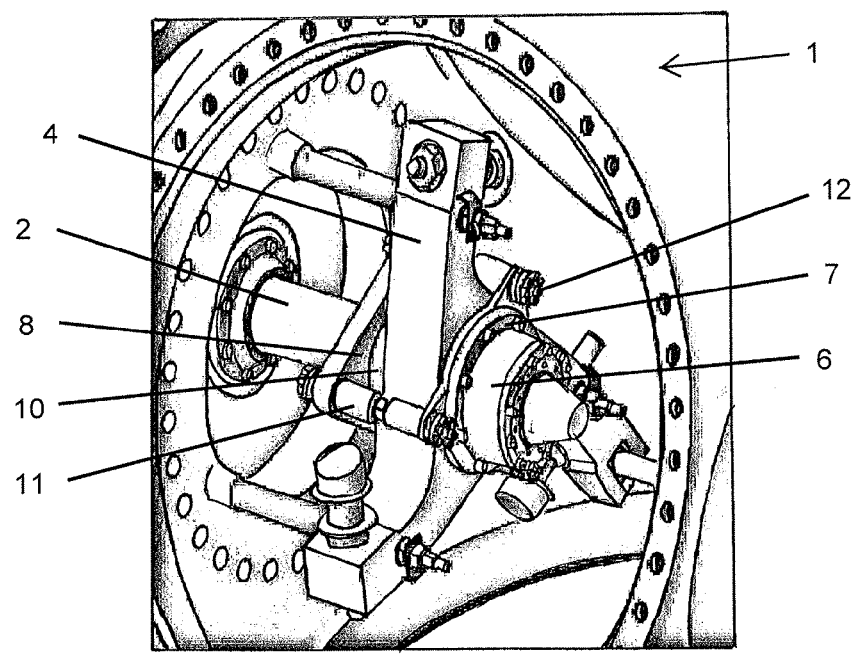

FIG. 2 includes all the elements making up the flange. One end has a triangular part enclosing a circular opening constituting the rear flange (8) while the opposite end also has a triangular part with a circular shape superimposed over the triangle with a small central opening and various orifices on the outer edges for accommodating the fastening systems making up the front flange (9). The circular hole inside the rear flange (8) houses a fastening element comprising a tapered collar (10) which on the inner part of the rear flange (8) comprises two rings (10.1, 10.2) having inclined planes on their contact surfaces so that when the bolts (10.3) on the collar are tightened, the inner ring (10.1) becomes narrower while the outer ring (10.2) expands. The tapered collar (10) constitutes the fastening with the hollow shaft (2) by friction. With this joint, the rear flange (8) no longer needs to be secured directly to the star (4). Both flanges are secured by their vertices by means of individual bushings (11) fastened with their corresponding nuts (12), thus establishing the indirect joint between the rear flange (8) and the star-shaped part (4). Given the tolerances affecting the parts to join, shims could be used at the joint securing the bushings (11) to the flanges, both front as well as rear, to ensure that the rear flange (8) makes no direct contact with the star (4).

The front flange (9) has through holes for anchoring to the bearing box (6), and these holes are distributed around the periphery of the circumference inscribed on the triangle. There are also through holes for anchoring to the hollow shaft (2), and these other holes are distributed around the central opening that goes through the shaft.

As shown in the various sequences in FIG. 3, the fastening method for the reinforcement follows the steps below:

The first step entails locking the star (4) to the hub (1) using lock shafts and the redundant system of lock blocks (not shown in the figures). The lock shafts comprise several threaded rods and hollow tubes. The rods go through the star and screw into some holes in the hub prepared for this purpose and their length suffices so that the rods can emerge from the front part of the star. The hollow bushings are mounted on the rear part of the star so that they make contact with both star and hub and the threaded rods cross through them. This prevents the star from moving towards the nacelle through the bushings. Nuts are fitted onto the threaded rods to keep the star from moving in the opposite direction. The blade lock blocks comprise two blocks that are secured to the stiffening plate on the blade bearing. They have an internal threaded hole for fitting a bolt inside, which lines up with the machined slots on the hub. This thus blocks any blade pitch movement.

Dismounting the nut from the pusher shaft, the bearing box (6) and the hollow shaft flange (5). The pusher shaft (3) will then be exposed on the star (4) side.

Depressurizing the hydraulic unit and moving the hollow shaft (2) out of the star (4) with a cone extractor.

The first step to place the flange of this invention entails installing the tapered collar (10) on the hollow shaft (2). The surface on the shaft at the spot where the collar will be mounted must be cleaned thoroughly before mounting the collar onto the shaft. Next, the rear flange (8) is mounted. The rear flange (8) has a specific position and should be oriented so that the bushings coupling both flanges remain between the arms on the star.

The hollow shaft (2) is then moved forward until it projects out at the front from the star (4).

The ensuing part to mount is the front flange (9), positioned so that the spacer bushings (11) remain between the arms on the star (4), followed by the rear flange (8), positioned so that it lines up with the bushings (11) from the front flange (9).

Three bushings (11) are then mounted and fastened with their corresponding nuts (12)

The bearing box (6) and the nut of the pusher shaft are placed.

The final step entails applying torque to the tapered collar (10)

The invention claimed is:

1. A fastening system comprising:
   a rotary shaft and a wind turbine pitch system of a three-blade variable pitch wind turbine, wherein said fastening system joins the rotary shaft and the wind turbine pitch system, said fastening system comprising
   a double flange formed by a front flange and a rear flange joined together, wherein
   the front flange is anchored to a pusher shaft of the pitch system which comprises a star-shaped part having arms that unite the blades of the wind turbine,
   a hollow rotary shaft goes through the rear flange, the hollow rotary shaft being frictionally engaged with the rear flange by a tapered collar on an inner part of the rear flange,
   both flanges, front and rear, are coupled together with at least three bushings
   wherein said at least three bushings are located between the arms of the star-shaped part and wherein the front and rear flanges sandwich the star-shaped part such that the front flange faces a front surface of the star-shaped part and the rear flange faces a rear surface of the star-shaped part.

2. The fastening system according to claim 1, wherein both flanges comprise periphery fastening holes on an outer contour for anchoring the bushings between the flanges, and a central orifice which the hollow shaft goes through.

3. The fastening system according to claim 1, wherein the flanges have a triangular shape, the front flange has a triangular shape with a circular shape superimposed over the triangle, the front flange has through holes for anchoring to a bearing box that are distributed around a periphery of the circular shape, and further, the front flange has through holes for anchoring to the hollow shaft that are distributed around a central orifice thereof through which the hollow shaft passes, the rear flange has a central opening where the tapered collar is inserted, that encircles the hollow shaft, completing the fastening thereon when applying the corresponding tightening torque to the tapered collar.

4. The fastening system according to claim 1, wherein the front flange and the rear flange are coupled together with three bushings, each one positioned on vertices of the flanges and secured at their ends by nuts having an elevated tightening torque.

5. The fastening system according to claim 1, wherein the tapered collar on the inner part of the rear flange comprises an inner ring and an outer ring, each having inclined planes on contact surfaces thereof so that when bolts on the tapered collar are tightened, the inner ring contracts while the outer ring expands.

\* \* \* \* \*